April 20, 1965 W. KRÄMER ETAL 3,178,909
SHEAR AND COUPLING THEREFOR
Filed March 6, 1962 2 Sheets-Sheet 1

WALTER KRÄMER
MARTIN KLEB
INVENTORS

BY *Norman S. Blodgett*
ATTORNEY

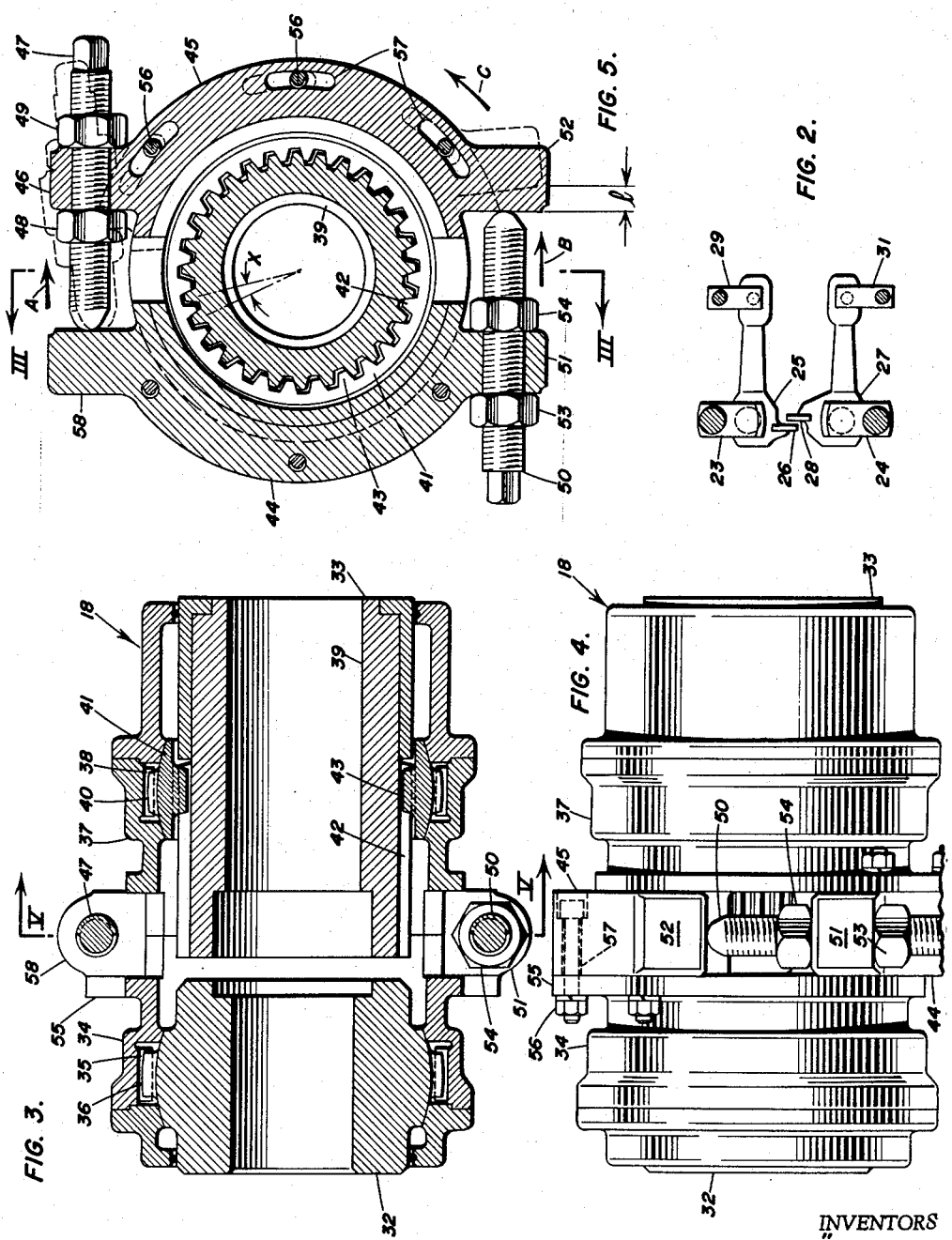

United States Patent Office 3,178,909
Patented Apr. 20, 1965

3,178,909
SHEAR AND COUPLING THEREFOR
Walter Krämer, Dahlbruch, Westphalia, and Martin Kleb, Musen, Kreis Siegen, Germany, assignors to Siemag Siegener Maschinenbau G.m.b.H., Dahlbruch, Westphalia, Germany, a corporation of Germany
Filed Mar. 6, 1962, Ser. No. 177,787
Claims priority, application Germany, Mar. 8, 1961,
S 72,887
1 Claim. (Cl. 64—24)

This invention relates to a shear and coupling therefor; more particularly, it relates to apparatus for performing a shearing operation and to apparatus arranged to join a driving shaft to a driven shaft of a shear or the like for the transmission of power.

Arrangements to reduce play in power transmission systems are well known. One such arrangement is the construction in which one gear wheel is connected to the load with an additional drive which has a slidable coupling and a one-direction overrunning clutch, the latter taking the form of a pawl or rolling coupling which drives the gear wheel at a higher speed. Devices of this kind are not only very complicated in their construction, but it is impossible or very difficult to adjust their working positions. This is especially true when the drive is connected to a machine having inter-acting tools. These and other difficulties have been obviated by the present invention.

It is, therefore, an outstanding object of the invention to provide a coupling which is simple in construction, relatively easy to operate for use in the heavy machine field, which coupling meets the operational requirements of such machinery and can be adjusted when desirable to suit the demands of the machine.

Another object of the invention is the provision of a coupling for joining a driving shaft to a driven shaft in which the angular relationship between the shafts may be readily adjusted.

A further object of the present invention is the provision of a coupling for joining a driving shaft to a driven shaft in which the amount of play or backlash in the coupling may be adjusted.

It is another object of the instant invention to provide a coupling for joining driving shafts to driven shafts, which coupling contains gear teeth for permitting angular misalignment and axial movement, the arrangement permitting the backlash between the gear teeth to be accurately adjusted.

It is a further object of the invention to provide a flying shear having two mating blades whose angular relationship and amount of play may be readily adjusted.

With these and other objects in view, as will be apparent to those skilled in the art, the invention resides in the combination of parts set forth in the specification and covered by the claim appended hereto.

The character of the invention, however, may be best understood by reference to one of its structural forms as illustrated by the accompanying drawings in which:

FIG. 2 is a sectional view of a portion of the apparatus taken on the line II—II of FIG. 1, FIG. 3 is a vertical sectional view of a coupling of the apparatus taken along the line III—III of FIG. 5;

FIG. 4 is a view of the exterior of the coupling from below with portions broken away, and FIG. 5 is a transverse sectional view of the coupling taken on the line V—V of FIG. 3.

Figure 1:
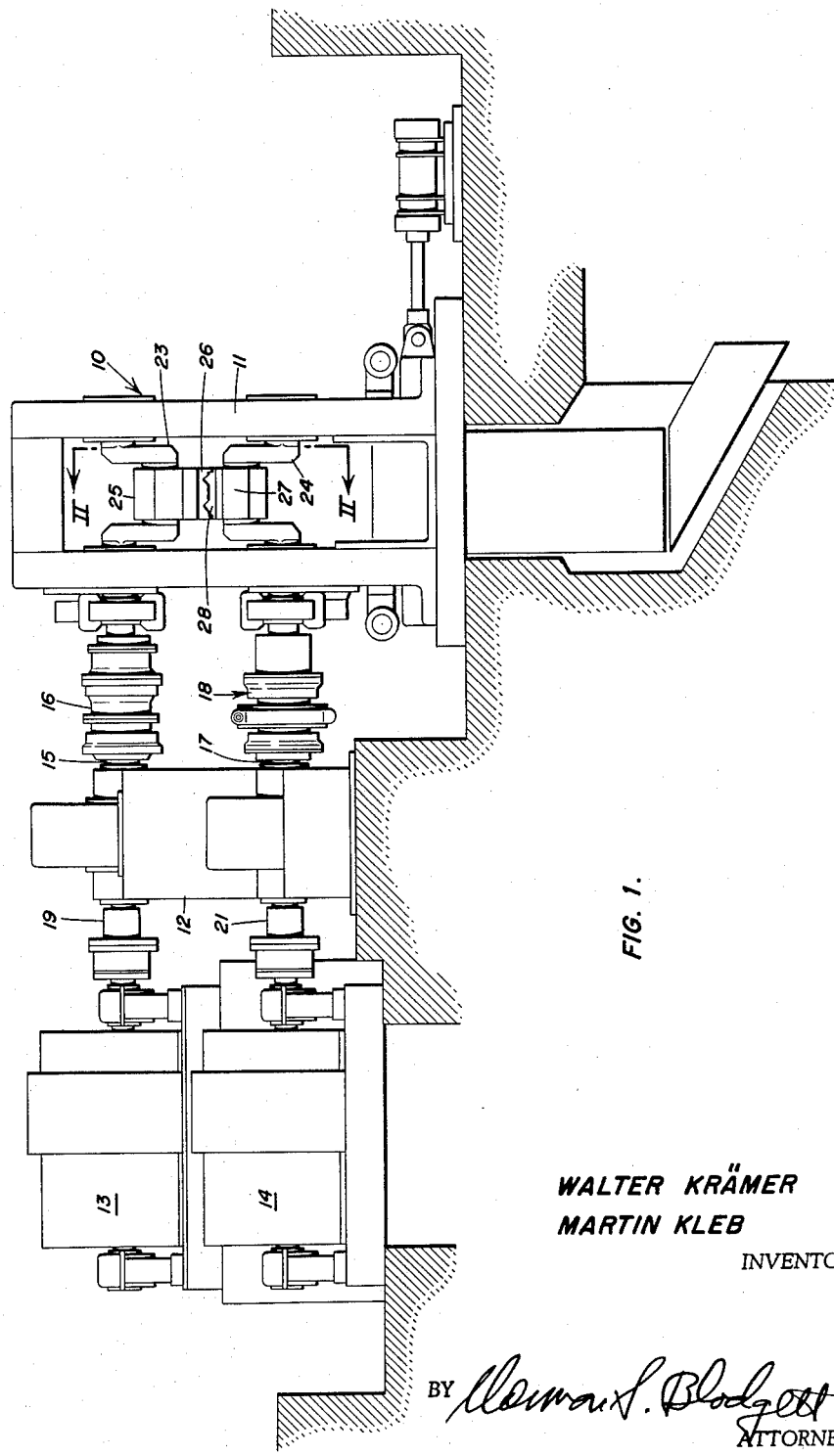
FIG. 1 is a transverse elevational view of shear apparatus embodying the principles of the present invention.

Referring to FIG. 1, wherein are best shown the general features of the invention, the shear apparatus, indicated generally by the reference numeral 10, is shown as comprising a flying shear 11 driven through a synchronizing gear box 12 by electric motors 13 and 14. The gear box 12 is connected to the shear 11 through a drive shaft 15 containing a clutch 16 and by a drive shaft 17 containing a clutch 18. The motor 13 is connected to the gear box 12 by a shaft 19 and the motor 14 is connected to the gear box by a shaft 21. The shear 11 is of the type intended to divide into short lengths metal rods or bars which are the product of a rolling mill. It is intended to divide them while the metal is moving or "on the fly." For that purpose, the shear is provided with an upper crank 23 and a lower crank 24. The upper crank carries a knife holder 25 having a knife 26, while the lower crank 24 carries a knife holder 27 having a knife 28. The shear is of the tail-rod type and the knife holder 25 is provided with an elongated rearwardly-directed tail whose angularity is controlled by a crank 29 to control the aspect of the knife holder during a cutting cycle. The knife holder 27 is similarly provided with a rearwardly-directed tail whose angularity is controlled by a crank 31.

FIGS. 3, 4, and 5 show the details of the coupling 18. This coupling consists of a first member 32 which is adapted to be connected to the driving shaft 17. The coupling also includes a second member 33 adapted to be attached to the adjacent end of a driven shaft connected to the lower crank 24 of the shear. The coupling includes a first generally-tubular coupling half 34 which surrounds the first member 32. The coupling half has internal gear teeth 35 with a cylindrical pitch surface which are engageable with external gear teeth 36 formed on the outer surface of the first member 32 and suitably formed, for instance, with a spherical pitch surface to permit substantial angular misalignment of the first member 32 with respect to the first coupling half 34 without binding or loss of power-transmitting ability.

The coupling also includes a second generally-tubular coupling half 37 which surrounds the second member 33 and is provided with internal gear teeth 38 having a cylindrical pitch surface; the second member 33 is provided with external gear teeth 40 having a spherical pitch surface which engage the internal gear teeth 38 on the second coupling half 37 to permit substantial misalignment between the second member 33 and the second coupling half 37 without binding and without substantial loss of power-transmitting ability. The second member 33 is formed in two parts as an inner portion 39 and an outer portion 41. The inner portion 39 is provided with external gear teeth 42 which extend axially of the inner portion a substantial distance, while the outer portion 41 is provided with internal gear teeth 43 of limited axial extent which mesh with the external gear teeth 42; the gear teeth 42 and the gear teeth 43 are both formed with cylindrical pitch surfaces and permit axial sliding between the inner and outer portions.

Extending axially from the first coupling half 34 toward the second coupling half 37 is a tubular extension 44 while a similar extension 45 extends from the second coupling half 37 toward the first coupling half. The two extensions 44 and 45 are co-extensive and each is formed as substantially less than a semi-circle so that there is a substantial gap between them, as is evident in FIG. 5. A substantial abutment 58 extends from one end of the extension 44, while a similar abutment 46 extends from the adjacent end of abutment 45. The two abutments are, therefore, parallel; through the abutment 46 extends in threaded relationship an adjusting set screw 47 having at its outer end a configuration adapted to receive a wrench and having its inner end rounded for engagement with the abutment 58. A set of lock nuts 48 and 49 are threaded on the set screw to fix it in a set position relative to the abutment 46. At the other end of the extension 44 is formed an abutment 51 which faces a corresponding abutment 52 extending from the adjacent end of the extension 45. The abutment 51 is threadedly engaged with a set screw 50 which is provided, in turn, with locking nuts 53 and 54. As is evident in FIG. 4, the first coupling half 34 is provided with a flange 55 in which are fastened a number of bolt-and-nut sets 56 which engage concentric slots 57 in the extension 45. Similar bolt-and-nut sets and slots extend from the second coupling half 37 into the extension 44.

The operation of the invention will now be readily understood in view of the above description. The gear box 12 consists in a geared connection between the shaft 19 and the shaft 21 which are, respectively, driven by the electric motors 13 and 14. Thus, it is guaranteed that, despite irregular running of the motors 13 and 14, the shafts 15 and 17 are in synchronization. Assuming that the clutch 16 locks the upper crank 23 to the shaft 15, it is only necessary to adjust the lower crank 24 and to assure that the proper amount of play exists in its drive system. Angular misalignment between the drive axis of the crank 24 and the shaft 17 is compensated for by the angular misalignment possible between the first member 32 and the first coupling half 34, this latter function being performed by means of the teeth 36 and their engagement with the teeth 35. This misalignment is also compensated for by the engagement between the teeth 38 and the teeth 40 on the second coupling half 37 and the second member 33. Furthermore, variations in the distance between the drive shaft 17 and the crank is taken care of by the sliding relationship between the inner portion 39 and the outer portion 41 which make up the second member 33. The first and second halves of the coupling may be turned relative to one another in a circumferential direction within the limits of the gap between their ends and within certain practical limitations due to the placement of the lock nuts on the set screws. A possible swing position of the coupling half 37 relative to the coupling half 34 is shown in FIG. 5 in dotted lines. For the displacement of the one coupling half into a new position, it is necessary to move the set screw 47 in the direction of the arrow A and then lock it in the wanted position with the help of the lock nuts 48 and 49. Thereafter, the set screw 16 must be moved in the direction of the arrow B until the end of the set screw 50 presses against the abutment 52 of the extension 45. The abutment 52 serves as a stop for the set screw 50 so that, in this case, the coupling half 34 moves in the direction of the arrow C for a distance shown in the drawing as $l$. Through this adjustment the backlash of the teeth 40 and 38, teeth 35 and 36, and teeth 42 and 43 will be eliminated by the shifting of a distance X in FIG. 5. On the other hand, by swinging the coupling halves relative to one another, the crank 24 shifts relative to the crank 23 so that play between the tools (in this case, the knives 26 and 28) is eliminated. If wear should occur between the flanks of the teeth in the coupling arrangement, or should play again occur between the knives, then a readjustment can be made very easily by adjusting the set screws 49 and 52.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

A coupling for joining a driving shaft to a driven shaft, comprising
(a) a first external gear member adapted to be mounted on the driving shaft,
(b) a second external gear member adapted to be mounted on the driven shaft,
(c) a first coupling half having an internal gear engaging the first external gear member,
(d) a second coupling half having an internal gear engaging the second external gear member, each coupling half being generally tubular with the ends of the halves abutting one another so that the halves are in substantial alignment, each of the abutting ends of the halves being provided with a tubular extension of less than semi-circular form, the extensions being co-extensive, and
(e) facing abutments extending from adjacent portions of the extensions and screw-type adjusting means extending between the facing abutments for adjusting the angular relationship between the first coupling half and the second coupling half.

References Cited by the Examiner
UNITED STATES PATENTS

| 1,905,431 | 4/33 | Banner | 64—9 |
| 1,969,433 | 8/34 | Smithmans | 83—345 |
| 2,804,925 | 9/57 | Hitchcock | 83—292 |
| 2,893,222 | 7/59 | Albedhyl et al. | 64—9 |
| 3,003,340 | 10/61 | Miller | 64—9 |
| 3,015,941 | 1/62 | Daniele | 64—24 |
| 3,067,643 | 12/62 | Ward | 83—345 |

FOREIGN PATENTS

| 485,734 | 11/17 | France. |
| 1,144,516 | 10/57 | France. |
| | | (Corresponding to U.S. 2,871,682) |
| 905,919 | 3/54 | Germany. |
| 534,354 | 3/41 | Great Britain. |

FRANK SUSKO, *Primary Examiner.*

EDWARD C. ALLEN, ROBERT C. RIORDON,
*Examiners.*